United States Patent
Lee et al.

(10) Patent No.: US 10,366,282 B2
(45) Date of Patent: Jul. 30, 2019

(54) HUMAN DETECTION APPARATUS AND METHOD USING LOW-RESOLUTION TWO-DIMENSIONAL (2D) LIGHT DETECTION AND RANGING (LIDAR) SENSOR

(71) Applicant: Daegu Gyeongbuk Institute of Science and Technology, Dalseong-gun, Daegu (KR)

(72) Inventors: Jong Hun Lee, Daegu (KR); Seong Kyung Kwon, Gyeongsangbuk-do (KR); Sang Hyuk Son, Daegu (KR); Eugin Hyun, Daegu (KR); Jin Hee Lee, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 0 days.

(21) Appl. No.: 15/618,877

(22) Filed: Jun. 9, 2017

(65) Prior Publication Data

US 2017/0357850 A1    Dec. 14, 2017

(30) Foreign Application Priority Data

Jun. 9, 2016    (KR) .................. 10-2016-0071677

(51) Int. Cl.
*G06K 9/00*    (2006.01)
*G01S 7/48*    (2006.01)
(Continued)

(52) U.S. Cl.
CPC ........ *G06K 9/00362* (2013.01); *G01S 7/4808* (2013.01); *G01S 17/89* (2013.01); *G06T 7/11* (2017.01)

(58) Field of Classification Search
CPC ..... G06K 9/00362; G06T 7/11; G01S 7/4808; G01S 17/89

See application file for complete search history.

(56) References Cited

U.S. PATENT DOCUMENTS

2010/0217529 A1* 8/2010 Stroila .................. G01S 17/89
702/5

FOREIGN PATENT DOCUMENTS

JP    05-281335    10/1993
JP    2011065400    3/2011
(Continued)

OTHER PUBLICATIONS

Kidono et al, Pedestrian Recognition Using High-definition LIDAR, 2011, 2011 IEEE Intelligent Vehicles Symposium (IV) Baden-Baden, Germany, pp. 405-410.*

Musleh et al, 'Identifying and Tracking Pedestrians Based on Sensor Fusion and Motion Stability Predictions', 2010, Sensors, 10, pp. 8028-8053 (Year: 2010).*

(Continued)

*Primary Examiner* — David F Dunphy
(74) *Attorney, Agent, or Firm* — TraskBritt

(57) ABSTRACT

A human detection apparatus and method using low-resolution two-dimensional (2D) light detection and ranging (LIDAR) sensor are provided. The human detection method may include receiving LIDAR data generated by reflecting a laser signal that continues to be transmitted to a search region from a plurality of objects in the search region, clustering a plurality of points included in the received LIDAR data by the same objects based on a correlation between the plurality of points, deriving a characteristic function used to identify a shape of a human, based on the clustered points, and determining whether each of the objects is a human based on the derived characteristic function.

11 Claims, 4 Drawing Sheets

(51) Int. Cl.
*G06T 7/11* (2017.01)
*G01S 17/89* (2006.01)

(56) References Cited

FOREIGN PATENT DOCUMENTS

| JP | 2011-191227 A | * | 9/2011 | ............ G01S 17/93 |
|----|---------------|---|--------|-------------------------|
| JP | 2011191227 A  |   | 9/2011 |                         |
| KR | 1020150045735 |   | 4/2015 |                         |
| KR | 10-2016-0057755 A | | 5/2016 |                       |
| KR | 101628155     |   | 6/2016 |                         |
| KR | 101655606     |   | 9/2016 |                         |
| KR | 101655682     |   | 9/2016 |                         |
| KR | 10-1804681 B1 |   | 12/2017|                         |

OTHER PUBLICATIONS

Kwon et al. A Novel Human Detection Scheme Using a Human Characteristics Function in a Low Resolution 2D LIDAR, Journal of the Korea Electromagnetic Engineering Society, vol. 11, No. 26, Oct. 2016, 7 pages.
Musleh et al., Identifying and Tracking Pedestrians Based on Sensor Fusion and Motion Stability Predictions, Sensors, Bol. 10, (2010), pp. 8028-8053.
Korean Notification of Reasons for Refusal for Korean Application No. 10-2016-0071677, dated Jul. 13, 2017, 6 pages with translation.
Korean Notice of Grant of Patent for Korean Application No. 10-2016-0071677, dated Nov. 23, 2017, 2 pages with translation.
Korean Final Notification of Reason for Refusal for Korean Application No. 10-2016-0071677, dated Sep. 18, 2017, 4 pages with translation.

* cited by examiner

1031997489/0.1406,2475.0,17
1031997489/1.3281,2534.5,12
1031997489/4.5313,9560.8,9
1031997489/5.9063,4258.0,9
1031997489/7.1094,4208.3,10
1031997489/8.2969,4208.3,10
1031997489/9.5156,4209.0,10
1031997489/10.7188,4258.8,11
1031997489/30.1094,1783.0,15
1031997489/31.3281,1751.3,14
1031997489/32.5496,1720.8,15
1031997489/33.7188,1691.8,20

HUMAN DETECTION APPARATUS AND METHOD USING LOW-RESOLUTION TWO-DIMENSIONAL (2D) LIGHT DETECTION AND RANGING (LIDAR) SENSOR

CROSS-REFERENCE TO RELATED APPLICATION

This application claims the benefit of Korean Patent Application No. 10-2016-0071677, filed on Jun. 9, 2016, in the Korean Intellectual Property Office, the disclosure of which is incorporated herein by reference.

TECHNICAL FIELD

At least one example embodiment relates to a human detection apparatus and method using a low-resolution two-dimensional (2D) light detection and ranging (LIDAR) sensor, and more particularly, to an apparatus and method for deriving a characteristic function used to identify a shape of a human based on LIDAR data acquired using a low-resolution 2D LIDAR sensor and for detecting a human using the derived characteristic function.

BACKGROUND

An interest in an Internet of Things (IoT) continues to grow. Smart home and autonomous vehicles are closely associated with human life, and accordingly are the most important fields of research among IoT application fields. Among the above fields of research, a human detection technology becomes increasingly important and is intensively discussed. The human detection technology may be used to provide a chat service or a service of delivering an article based on a user's location in a smart home environment. Also, in an autonomous vehicle, the human detection technology may be used for safety of a driver and a pedestrian. Existing human detection technologies have been studied to increase a detection rate using various sensors.

In one of the existing human detection technologies, equipment including a high-resolution, high-performance LIDAR sensor may be used. However, the equipment is expensive and requires a complex algorithm and a long processing time to interpret data. Also, it is inappropriate to use the equipment indoors due to a large size of the equipment.

On the other hands, when equipment including a low-resolution LIDAR sensor is used, an issue of insufficient output data to accurately sense an object may occur. Equipment including a high-resolution LIDAR sensor may clearly sense a shape of a human that is to be detected due to a high resolution, whereas the equipment including the low-resolution LIDAR sensor may fail to clearly sense a shape of a human due to a low resolution.

BRIEF SUMMARY

Example embodiments provide an apparatus and method for deriving a higher-order human characteristic function used to identify a shape of a human based on light detection and ranging (LIDAR) data acquired using an apparatus including a low-resolution LIDAR sensor and for detecting a human using the derived higher-order human characteristic function.

According to an aspect, there is provided a human detection method using a LIDAR sensor, including receiving LIDAR data generated by reflecting a laser signal that continues to be transmitted to a search region from a plurality of objects in the search region, clustering a plurality of points included in the received LIDAR data by the same objects based on a correlation between the plurality of points, deriving a characteristic function based on the clustered points, the characteristic function being used to identify a shape of a human, and determining whether each of the objects is a human based on the derived characteristic function.

The human detection method may further include filtering invalid LIDAR data from the received LIDAR data. The clustering may include clustering a plurality of points included in the filtered LIDAR data by the same objects based on a correlation between the plurality of points included in the filtered LIDAR data.

The human detection method may further include setting a region of interest (ROI) in which a human is to be sensed in the search region. The clustering may include clustering a plurality of points included in LIDAR data corresponding to the set ROI by the same objects based on a correlation between the plurality of points included in the LIDAR data corresponding to the set ROI.

The characteristic function may be a multi-order polynomial curve function.

The determining may include extracting human feature data based on the derived characteristic function, and comparing the extracted human feature data to prestored human feature data, to determine whether each of the objects is a human.

The human feature data may include at least one of information about a width, a circumference and a height of a human body.

According to another aspect, there is provided a human detection apparatus using a LIDAR sensor, including a receiver configured to receive LIDAR data generated by reflecting a laser signal that continues to be transmitted to a search region from a plurality of objects in the search region, a clusterer configured to cluster a plurality of points included in the received LIDAR data by the same objects based on a correlation between the plurality of points, a deriver configured to derive a characteristic function based on the clustered points, the characteristic function being used to identify a shape of a human, and a determiner configured to determine whether each of the objects is a human based on the derived characteristic function.

The human detection apparatus may further include a filter configured to filter invalid LIDAR data from the received LIDAR data. The clusterer may be further configured to cluster a plurality of points included in the filtered LIDAR data by the same objects based on a correlation between the plurality of points included in the filtered LIDAR data.

The human detection apparatus may further include a setter configured to set a ROI in which a human is to be sensed in the search region. The clusterer may be further configured to cluster a plurality of points included in LIDAR data corresponding to the set ROI by the same objects based on a correlation between the plurality of points included in the LIDAR data corresponding to the set ROI.

The determiner may be further configured to extract human feature data based on the derived characteristic function, to compare the extracted human feature data to prestored human feature data, and to determine whether each of the objects is a human.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figures 1, 2:
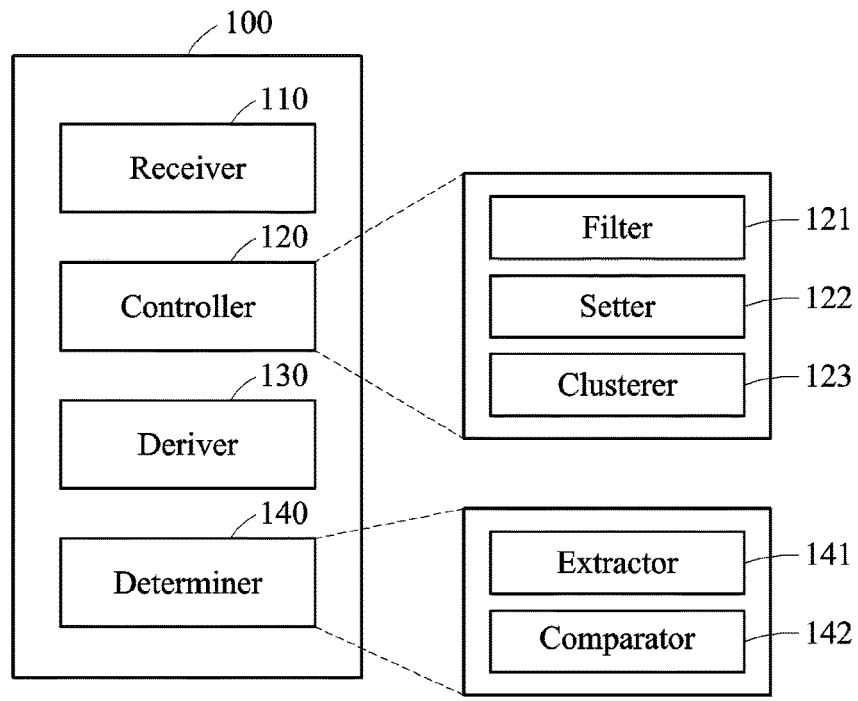
FIG. 1 is a diagram illustrating a human detection apparatus according to an example embodiment.
FIG. 2 is a diagram illustrating an example of low-resolution two-dimensional (2D) light detection and ranging (LIDAR) data according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the examples are not construed as limited to the disclosure and should be understood to include all changes, equivalents, and replacements within the idea and the technical scope of the disclosure.

Although terms of "first," "second," and the like, are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical or scientific terms used herein have the same meanings as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

FIG. 1 is a diagram illustrating a human detection apparatus 100 according to an example embodiment.

Referring to FIG. 1, the human detection apparatus 100 may include a receiver 110, a controller 120, a deriver 130 and a determiner 140. The human detection apparatus 100 may comprise a processor, and the processor may perform the functions of the receiver 110, the controller 120, the deriver 130 and the determiner 140. The receiver 110 may receive LIDAR data from an apparatus (hereinafter, referred to as a "low-resolution LIDAR apparatus") that includes a low-resolution two-dimensional (2D) LIDAR sensor. The low-resolution LIDAR apparatus may continue to transmit a laser signal horizontally to a search region to be searched. The low-resolution 2D LIDAR sensor may receive the laser signal reflected from a plurality of objects in the search region. The received laser signal may include LIDAR data corresponding to information about a distance and an angle between the low-resolution 2D LIDAR sensor and an object, and may be represented by a plurality of points in a coordinate system.

For example, in an initialization operation, the low-resolution LIDAR apparatus may wait until an angle value measured in the horizontal direction by a LIDAR sensor reaches a range of 0° to 1°. The low-resolution LIDAR apparatus may transmit a laser signal and may receive a laser signal reflected from an object whenever the angle value ranges from 0° to 1°. In this example, the low-resolution LIDAR apparatus may transmit and receive a laser signal until the measured angle value reaches a range of 0° to 360°, and may collect LIDAR data included in the received laser signal.

The controller 120 may process LIDAR data collected by the receiver 110 to use the processed LIDAR data to derive a characteristic function used to identify a shape of a human. The controller 120 may include a filter 121, a setter 122 and a clusterer 123.

The filter 121 may filter invalid LIDAR data from the LIDAR data collected by the receiver 110. According to an example embodiment, a method of detecting a human using a LIDAR sensor may be provided. Accordingly, a criterion to process the collected LIDAR data based on physical characteristics of a human may be set in advance. For example, LIDAR data that is less than or equal to 0.3 meter (m) and greater than or equal to 2.5 m may be determined to indicate objects other than a human, and may be filtered in advance from LIDAR data collected using the LIDAR sensor.

For example, the filter 121 may filter invalid LIDAR data from LIDAR data based on the set criterion using a Gaussian filter, and the like, may apply the Gaussian filter to an intensity value of the LIDAR data, and may remove a noise signal received using the LIDAR sensor. Thus, it is possible to reduce a data throughput and a data processing time.

The setter 122 may set a region of interest (ROI) in which a human is to be sensed, in a search region in which the low-resolution LIDAR apparatus transmits and receives a laser signal.

For example, the low-resolution LIDAR apparatus may transmit and receive a laser signal until an angle value measured in the horizontal direction reaches a range of 0° to 360°, and may collect LIDAR data included in the received laser signal. In this example, when the low-resolution LIDAR apparatus is to detect a human in all measurable ranges, the setter 122 may set a ROI to be in a maximum measurement range (for example, the range of 0° to 360°) of the low-resolution 2D LIDAR sensor. In another example, when the low-resolution LIDAR apparatus is to detect a human in a portion of the search region corresponding to a range of 0° to 90°, the setter 122 may set a ROI to be in a measurement range of 0° to 90° of the low-resolution 2D LIDAR sensor.

The clusterer 123 may cluster a plurality of points included in LIDAR data in the ROI by the same objects based on a correlation between the plurality of points. Because the LIDAR data is represented by a single point based on a value $\Delta a$ of a horizontal angular resolution, a single object may be represented by a plurality of points during a single scan. Accordingly, the clusterer 123 may perform clustering based on a correlation between points in a ROI to form groups of the same objects.

The deriver 130 may derive a characteristic function used to identify a shape of a human, based on the LIDAR data processed by the controller 120. For example, the deriver 130 may apply LIDAR data grouped by the same objects by the clusterer 123 to a higher-order polynomial, and may derive the characteristic function defined a higher-order human characteristic function. The deriver 130 may derive the higher-order human characteristic functions for each object in the ROI.

The determiner 140 may determine whether an object in the ROI is a human, based on the higher-order human characteristic function derived by the deriver 130. The determiner 140 may include an extractor 141 and a comparator 142. The extractor 141 may extract human feature data representing a shape of a human from a coefficient of a polynomial of the derived higher-order human characteristic function. The comparator 142 may compare the extracted human feature data to prestored human feature data, to determine whether the object in the ROI is the human.

When the object is determined to be the human as a result of comparison between the extracted human feature data and the prestored human feature data, the comparator 142 may additionally verify information about a size of the human, a direction in which the human is standing and a movement speed of the human.

FIG. 2 is a diagram illustrating an example of low-resolution 2D LIDAR data according to an example embodiment.

According to an example embodiment, a method of detecting a human based on insufficient LIDAR data acquired by a low-resolution LIDAR apparatus may be provided. When an object is sensed using a LIDAR sensor, LIDAR data including information about an angle and a distance between the LIDAR sensor and the object may be obtained. The LIDAR data may be represented by a plurality of points in a coordinate system. FIG. 2 illustrates an example of LIDAR data acquired using the low-resolution LIDAR apparatus, and a time stamp, an angle, a distance and an intensity in an order from left to right.

When a high-resolution LIDAR sensor is used, an angular difference $\Delta a$ between i-th measured data and (i+1)-th measured data may be set to range from 0.01° to 0.1667°, that is, a constant angular difference may be set by a user. However, when a low-resolution LIDAR sensor is used, an angular difference $\Delta a$ between i-th measured data and (i+1)-th measured data may be less than or equal to 1°, that is, an inconsistent angular difference may be set, and it is impossible for a user to set the angular difference $\Delta a$. Accordingly, LIDAR data measured by the low-resolution LIDAR sensor may be insufficient in comparison to the high-resolution LIDAR sensor, and thus it is impossible to exactly find a feature of a human. Also, when a low-performance, low-resolution LIDAR sensor is used, different angles and different distances may be measured even though the same object continues to be detected.

Figure 3A:
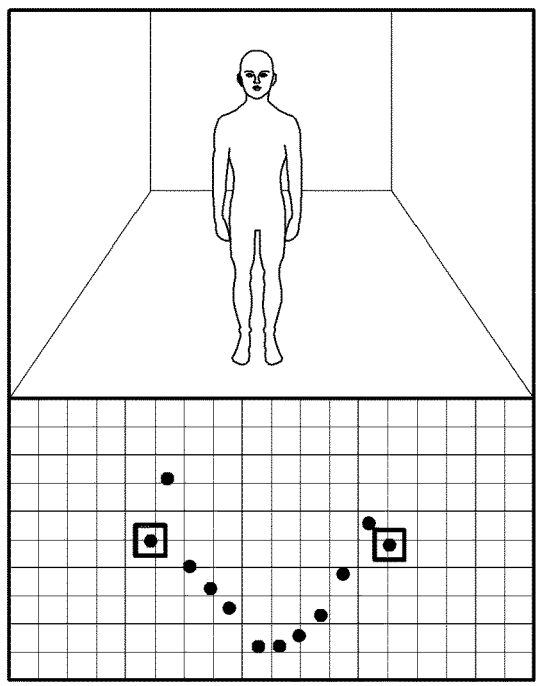
FIGS. 3A and 3B are diagrams illustrating examples of a LIDAR data distribution of a human measured using a 2D LIDAR sensor according to an example embodiment.
Figure 3B:
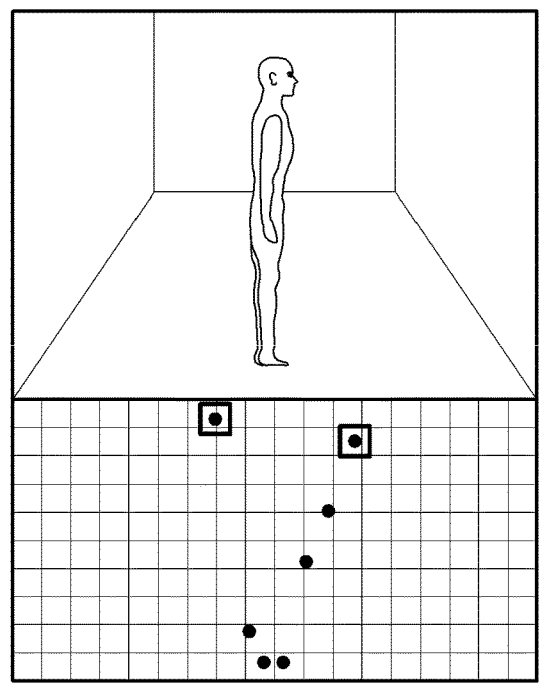

FIGS. 3A and 3B are diagrams illustrating examples of a LIDAR data distribution of a human measured using a 2D LIDAR sensor according to an example embodiment.

FIG. 3A illustrates LIDAR data measured using a low-resolution LIDAR apparatus when a front of a human faces the low-resolution LIDAR apparatus. In FIG. 3A, each of points in a coordinate system represent LIDAR data based on each horizontal angular resolution, and points in squares represent a first point and a last point of the measured LIDAR data.

FIG. 3B illustrates LIDAR data measured using the low-resolution LIDAR apparatus when a side of a human faces the low-resolution LIDAR apparatus. In FIG. 3B, each of points in a coordinate system represent LIDAR data based on each horizontal angular resolution, and points in squares represent a first point and a last point of the measured LIDAR data.

When a horizontal angular resolution of the LIDAR sensor increases, a shape of a measurement target may more clearly appear. When the horizontal angular resolution decreases, it may be relatively difficult to analyze the shape of the measurement target. Thus, it may be difficult to determine a human based on a shape of a measurement target using the low-resolution LIDAR apparatus.

Figure 4:
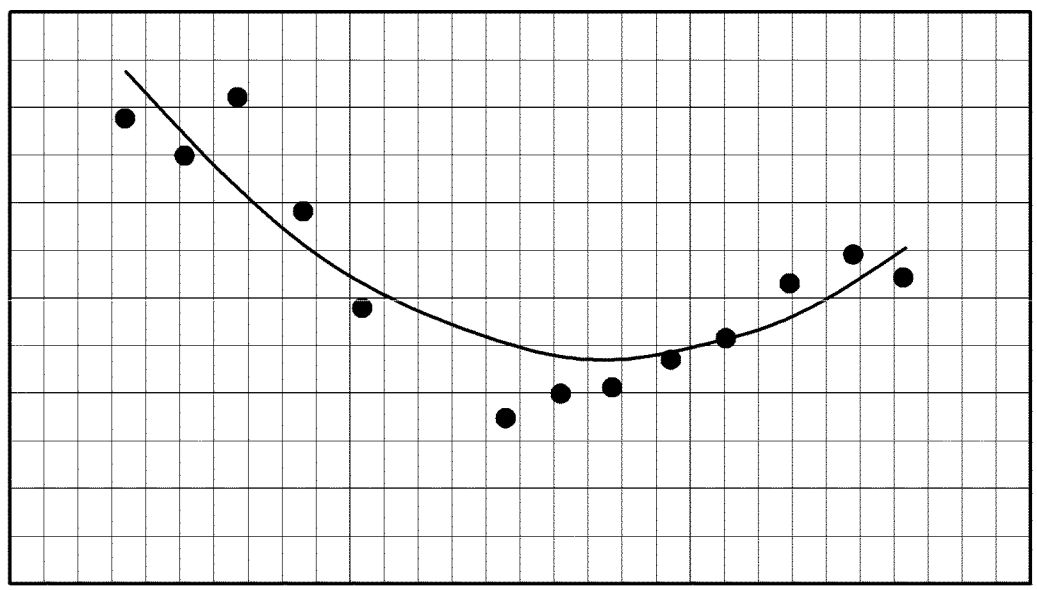
FIG. 4 is a diagram illustrating an example of deriving a characteristic function based on LIDAR data of a human measured using a 2D LIDAR sensor according to an example embodiment.

FIG. 4 is a diagram illustrating an example of deriving a higher-order human characteristic function based on LIDAR data of a human measured using a 2D LIDAR sensor according to an example embodiment. The higher-order human characteristic function may be used to identify a shape of a human.

As described above, a constant result for LIDAR data measured using a low-resolution LIDAR apparatus may not be obtained, and a quantity of the LIDAR data may be insufficient in comparison to LIDAR data measured using an apparatus including a high-resolution LIDAR sensor. For example, when the human detection apparatus 100 classifies an object as a human based on information about a width and thickness extracted from the measured LIDAR data, general obstacles with widths and thicknesses that are similar to those of the human may be classified as humans.

To overcome the above problem, the human detection apparatus 100 may apply LIDAR data grouped by the same objects to a higher-order polynomial to distinguish a human from an obstacle, and may derive a higher-order human characteristic function used to identify a shape of a human.

The human detection apparatus 100 may approximate inconsistent LIDAR data with a curve of the higher-order human characteristic function that is in a form of a higher-order polynomial, and may extract human feature data representing a shape of a human from an approximated higher-order human characteristic function.

Figure 5:
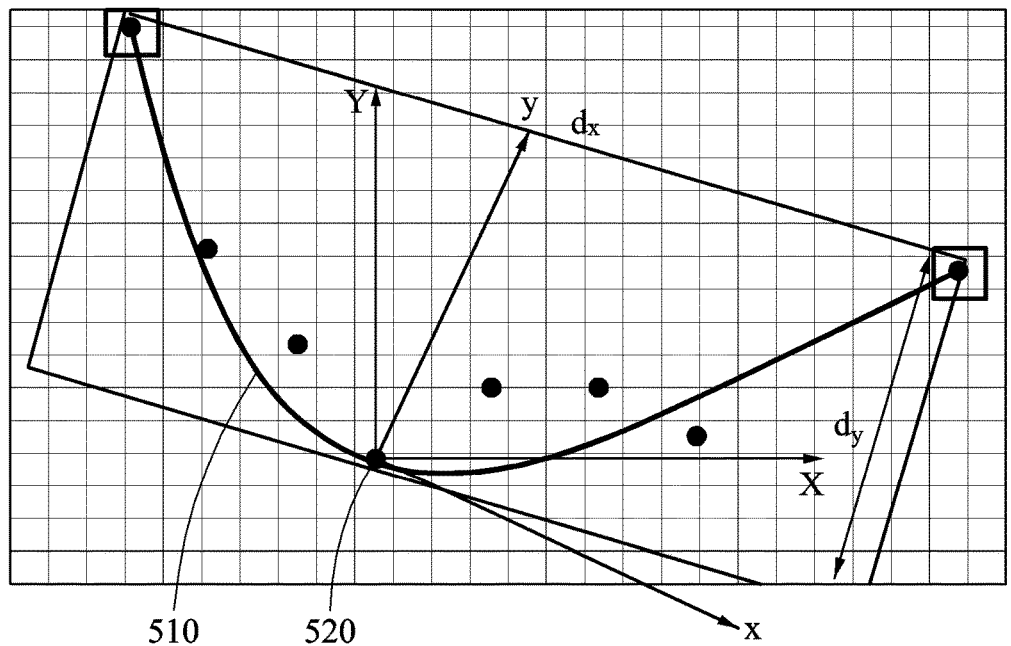
FIG. 5 is a diagram illustrating an example of extracting feature data of a human using a derived characteristic function according to an example embodiment.

FIG. 5 is a diagram illustrating an example of extracting human feature data using a derived higher-order human characteristic function according to an example embodiment.

As described above with reference to FIG. 4, LIDAR data measured using a low-resolution LIDAR apparatus may be represented by a plurality of points in a coordinate system of a LIDAR data map. A higher-order human characteristic function 510 used to identify a shape of a human may be derived based on LIDAR data corresponding to the points.

The higher-order human characteristic function 510 may be similar to a shape of a human expected to be acquired when measurement is performed using an apparatus including a high-resolution LIDAR sensor.

In the LIDAR data map, coordinates of x- and y-axes as a global criterion of a search region may be defined as global coordinates, and coordinates of x- and y-axes applied to a ROI to which the higher-order human characteristic function 510 is applied may be defined as local coordinates.

Also, a distance between a point corresponding to a minimum value and a point corresponding to a maximum value among LIDAR data in the ROI in the x-axis of global coordinates may be denoted by $d_x$, and a point 520 corresponding to a minimum value of the higher-order human characteristic function 510 may be set as an origin of local coordinates.

In the local coordinates, the x-axis may be set as a component forming a normal line with respect to a straight line connecting the origin and a central point of the distance $d_x$, and the y-axis may be set as a component forming a normal line with the x-axis.

The human detection apparatus 100 may extract human feature data representing a human using the higher-order human characteristic function 510. For example, the distance $d_x$ may also represent a width of an object, and $d_y$ may denote a thickness of the object. Also, a slope may be extracted from the higher-order human characteristic function 510.

For example, a slope of a human characteristic function may be defined as a rotation angle Θ of the human characteristic function between global coordinates used as global criterion of a search region and local coordinates associated with a ROI.

A width and a thickness may be dependent on a width and a circumference of a human body, and a slope may be dependent on a movement speed and a posture of a human. The slope of the human characteristic function may be simply obtained by projecting the local coordinates onto the global coordinates. For example, a dot product between the local coordinates and the global coordinates may be performed to obtain the slope.

The human feature data extracted using the higher-order human characteristic function 510 may be compared to prestored human feature data, to determine whether a corresponding object is a human.

Figure 6:
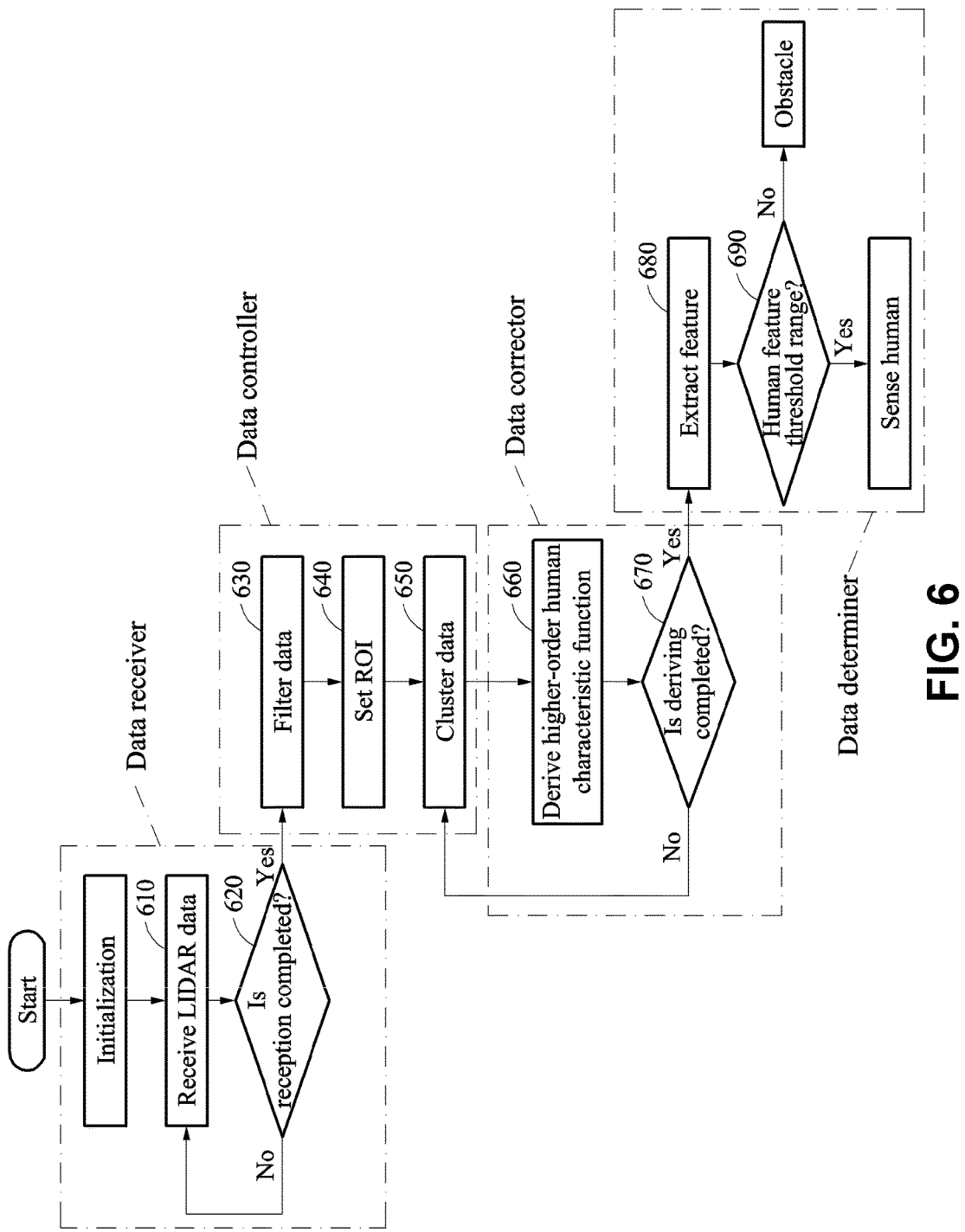
FIG. 6 is a diagram illustrating an algorithm of a human detection method according to an example embodiment.

FIG. 6 is a diagram illustrating an algorithm of a human detection method according to an example embodiment.

Referring to FIG. 6, in operation 610, the human detection apparatus 100 may receive LIDAR data from a low-resolution LIDAR apparatus. For example, in an initialization operation, the low-resolution LIDAR apparatus may wait until an angle value measured in a horizontal direction by a LIDAR sensor reaches a range of 0° to 1°. The low-resolution LIDAR apparatus may transmit a laser signal and may receive a laser signal reflected from an object whenever the angle value ranges from 0° to 1°. In this example, the low-resolution LIDAR apparatus may transmit and receive a laser signal until the measured angle value reaches a range of 0° to 360°, and may collect LIDAR data included in the received laser signal.

When the receiving of the LIDAR data is completed in operation 620, the human detection apparatus 100 may filter invalid LIDAR data from the received LIDAR data in operation 630. The human detection apparatus 100 may set, in advance, a criterion to process the collected LIDAR data based on physical characteristics of a human. For example, LIDAR data that is less than or equal to 0.3 m and greater than or equal to 2.5 m may be determined to indicate objects other than a human, and may be filtered in advance from LIDAR data collected using the LIDAR sensor.

The human detection apparatus 100 may filter invalid LIDAR data from LIDAR data based on the set criterion using a Gaussian filter, and the like, may apply the Gaussian filter to an intensity value of the LIDAR data, and may remove a noise signal received using the LIDAR sensor. Thus, it is possible to reduce a data throughput and a data processing time.

In operation 640, the human detection apparatus 100 may set a ROI in which a human is to be sensed, in a search region in which the low-resolution LIDAR apparatus transmits and receives a laser signal.

For example, the low-resolution LIDAR apparatus may transmit and receive a laser signal until an angle value measured in the horizontal direction reaches a range of 0° to 360°, and may collect LIDAR data included in the received laser signal. In this example, when the low-resolution LIDAR apparatus is to detect a human in all measurable ranges, the human detection apparatus 100 may set a ROI to be in a maximum measurement range (for example, the range of 0° to 360°) of the low-resolution 2D LIDAR sensor. In another example, when the low-resolution LIDAR apparatus is to detect a human in a portion of the search region corresponding to a range of 0° to 90°, the human detection apparatus 100 may set a ROI to be in a measurement range of 0° to 90° of the low-resolution 2D LIDAR sensor.

In operation 650, the human detection apparatus 100 may cluster a plurality of points included in LIDAR data in the ROI by the same objects based on a correlation between the plurality of points. The LIDAR sensor may acquire output results for each horizontal angular resolution. Accordingly, a plurality of output results may be acquired by a continuous scanning range of a horizontal angular resolution of the LIDAR sensor even though a single object is detected. A process of grouping the plurality of output results by objects may be referred to as "clustering." For example, the human detection apparatus 100 may cluster LIDAR data using at least one of distance-based clustering, Gaussian mixture model (GMM) clustering or K-means clustering.

In operation 660, the human detection apparatus 100 may derive a higher-order human characteristic function used to identify a shape of a human, based on the points clustered in operation 650. For example, the human detection apparatus 100 may apply LIDAR data grouped by the same objects to a higher-order polynomial, and may derive the higher-order human characteristic function. The human detection apparatus 100 may derive higher-order human characteristic functions for each object in the ROI.

The human detection apparatus 100 may correct measured LIDAR data based on a general higher-order polynomial as shown in Equation 1 below.

$$f_i = \sum_{j=0}^{m} a_j x_i^j \qquad \text{Equation 1}$$

In Equation 1, f denotes an optimal polynomial, x denotes an input value, a denotes a coefficient of the polynomial, and m denotes a degree of the polynomial. When LIDAR data included in the same cluster is applied to Equation 2 based on Equation 1, a correction result may be obtained. For example, the human detection apparatus 100 may predict a human characteristic function through curve-fitting of the measured LIDAR data, as shown in Equation 2 below.

$$y[i] = \sum_{j=0}^{m} a_j (x[i])^j \qquad \text{Equation 2}$$

Also, the human detection apparatus 100 may acquire a coefficient and degree of a polynomial of a higher-order human characteristic function for minimizing an error based on a least square technique, using Equation 3 shown below.

$$\frac{1}{N} \sum_{i=0}^{N-1} w_i (f_i - y_i)^2 \qquad \text{Equation 3}$$

In Equation 3, N denotes a length of y, and w denotes a weight. Correcting of LIDAR data by the human detection apparatus 100 may indicate representing insufficient LIDAR data in the form of streamlines showing a characteristic of a human using the higher-order human characteristic function. An experimental result may show that a quadric human characteristic function has the best human detection characteristic using a LIDAR sensor.

When the deriving of the higher-order human characteristic function is completed in operation 670, the human detection apparatus 100 may extract human feature data representing a shape of a human from the derived higher-order human characteristic function in operation 680. The human feature data may be extracted from a coefficient of a polynomial of the higher-order human characteristic function.

In operation 690, the human detection apparatus 100 may determine whether an object in the ROI is a human by comparing the human feature data extracted in operation 680 to prestored human feature data. The human feature data may include at least one of information about a width, a circumference and a height of a human body.

The algorithm corresponding to operations 610 through 690 may be used to distinguish a specific object as well as a human by adding feature data of the specific object.

As described above, example embodiments may provide a technology of detecting an object inside a building or a technology that may be utilized in a field, for example, robots or vehicles. Also, example embodiments may provide a method of minimizing a high cost and a complex operation that are disadvantages of a human detection method using an existing high-resolution LIDAR sensor, and of quickly and accurately detecting a human even though insufficient LIDAR data acquired using a low-resolution LIDAR sensor is used. In addition, an object may not be captured by a camera, and thus it is possible to detect a human indoors without invading a privacy. Furthermore, apparatuses other than the LIDAR sensor may not be required, and thus it is possible to avoid a near obstacle as well as an obstacle inside a building or in a vehicle and possible to expect a development as a navigation system.

According to example embodiments, a higher-order human characteristic function used to identify a shape of a human may be derived based on LIDAR data acquired using a low-resolution LIDAR apparatus, and a human may be detected using the derived higher-order human characteristic function.

The apparatuses, equipment and other components described herein may be implemented using hardware components, software components, and/or a combination thereof. For example, a processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A human detection method performed by a processor using a light detection and ranging (LIDAR) sensor, the human detection method comprising:
   receiving LIDAR data generated by reflecting a laser signal that continues to be transmitted to a search region from a plurality of objects in the search region;
   clustering a plurality of points included in the received LIDAR data by the same objects based on a correlation between the plurality of points;
   applying the plurality of clustered points to a higher-order polynomial to derived a higher-order characteristic function, the higher-order characteristic function being used to identify a shape of a human; and
   determining whether each of the objects is a human based on the derived higher-order characteristic function.

2. The human detection method of claim 1, further comprising:
   filtering invalid LIDAR data among the received LIDAR data,
   wherein the clustering comprises clustering a plurality of points included in the filtered LIDAR data by the same objects based on a correlation between the plurality of points included in the filtered LIDAR data.

3. The human detection method of claim 1, further comprising:
   setting a region of interest (ROI) in which a human is to be sensed in the search region,
   wherein the clustering comprises clustering a plurality of points included in LIDAR data corresponding to the set ROI by the same objects based on a correlation between the plurality of points included in the LIDAR data corresponding to the set ROI.

4. The human detection method of claim 1, wherein the higher-order characteristic function is a multi-order polynomial curve function.

5. The human detection method of claim 1, wherein the determining comprises:
   extracting human feature data based on the derived higher-order characteristic function; and
   comparing the extracted human feature data to prestored human feature data, to determine whether each of the objects is a human.

6. The human detection method of claim 5, wherein the human feature data comprises at least one of information about a width, a circumference and a height of a human body.

7. A non-transitory computer readable recording medium storing computer readable instructions to cause at least one processor to implement the method of claim 1.

8. A human detection apparatus using a light detection and ranging (LIDAR) sensor, the human detection apparatus comprising:
   a processor, the processor comprising:
      a receiver configured to receive LIDAR data generated by reflecting a laser signal that continues to be transmitted to a search region from a plurality of objects in the search region;
      a clusterer configured to cluster a plurality of points included in the received LIDAR data by the same objects based on a correlation between the plurality of points;
      a deriver configured to apply the clustered points to a higher-order polynomial to derive a higher-order characteristic function, the higher-order characteristic function being used to identify a shape of a human; and
      a determiner configured to determine whether each of the objects is a human based on the derived higher-order characteristic function.

9. The human detection apparatus of claim 8, further comprising:
   a filter configured to filter invalid LIDAR data among the received LIDAR data,
   wherein the clusterer is further configured to cluster a plurality of points included in the filtered LIDAR data by the same objects based on a correlation between the plurality of points included in the filtered LIDAR data.

10. The human detection apparatus of claim 8, further comprising:
    a setter configured to set a region of interest (ROI) in which a human is to be sensed in the search region,
    wherein the clusterer is further configured to cluster a plurality of points included in LIDAR data corresponding to the set ROI by the same objects based on a correlation between the plurality of points included in the LIDAR data corresponding to the set ROI.

11. The human detection apparatus of claim 8, wherein the determiner is further configured to extract human feature data based on the derived higher-order characteristic function, to compare the extracted human feature data to prestored human feature data, and to determine whether each of the objects is a human.

* * * * *

UNITED STATES PATENT AND TRADEMARK OFFICE
CERTIFICATE OF CORRECTION

PATENT NO.         : 10,366,282 B2                      Page 1 of 1
APPLICATION NO.    : 15/618877
DATED              : July 30, 2019
INVENTOR(S)        : Jong Hun Lee et al.

It is certified that error appears in the above-identified patent and that said Letters Patent is hereby corrected as shown below:

In the Claims

| | | | |
|---|---|---|---|
| Claim 1, | Column 11, | Line 44, | change "to derived a" to --to derive a-- |
| Claim 9, | Column 12, | Line 43, | change "LIDAR data," to --LIDAR data;-- |
| Claim 9, | Column 12, | Line 51, | change "the search region," to --the search region;-- |

Signed and Sealed this
Fifteenth Day of October, 2019

Andrei Iancu
*Director of the United States Patent and Trademark Office*